US008317195B1

(12) United States Patent
Bridges

(10) Patent No.: US 8,317,195 B1
(45) Date of Patent: Nov. 27, 2012

(54) DOCUMENT IMAGING SYSTEM WITH DOCUMENT ENTRY GUIDE SURFACE

(75) Inventor: Richard Thomas Calhoun Bridges, London (GB)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/217,340

(22) Filed: Aug. 25, 2011

(51) Int. Cl.
*G03G 15/00* (2006.01)
(52) U.S. Cl. ........................................ 271/264; 399/367
(58) Field of Classification Search .................. 271/3.14, 271/264; 399/365, 367; 358/498
See application file for complete search history.

(56) References Cited

U.S. PATENT DOCUMENTS

| 4,739,376 | A | * | 4/1988 | Kanekol | 355/75 |
| 5,881,350 | A | * | 3/1999 | Wada et al. | 399/367 |
| 6,151,478 | A | * | 11/2000 | Katsuta et al. | 399/372 |
| 6,163,659 | A | * | 12/2000 | Chen | 399/17 |
| 7,719,730 | B2 | * | 5/2010 | Park et al. | 358/498 |
| 7,914,002 | B2 | * | 3/2011 | Yamada | 271/264 |
| 7,942,410 | B2 | * | 5/2011 | Wilsher et al. | 271/264 |
| 2002/0039207 | A1 | * | 4/2002 | Kanda | 358/498 |
| 2009/0322010 | A1 | * | 12/2009 | Kusama | 271/3.14 |

* cited by examiner

*Primary Examiner* — Jeremy R Severson
(74) *Attorney, Agent, or Firm* — Fay Sharpe LLP

(57) ABSTRACT

A document imaging system includes a document transport system that transports an original document through an imaging zone in optical communication with an image recording device. A document guide directs the original document, including a leading edge at a first angle, toward the imaging zone, while a document biasing device urges a trailing edge of the original document at a second angle toward the imaging zone.

9 Claims, 4 Drawing Sheets

DOCUMENT IMAGING SYSTEM WITH DOCUMENT ENTRY GUIDE SURFACE

BACKGROUND

The subject matter of the present disclosure broadly relates to the art of document imaging systems and, more particularly, to a document imaging system that is capable of reducing variations in the recorded image of an original document, such as may be used in connection with an electronic document storage system or in association with a printing system, for example, as well as a method of imaging original documents using the same.

Document imaging systems of a wide variety of types and kinds are known and commonly used. For example, such systems often take the form of automatic document handlers or scanners for electrophotographic copy machines and other printing systems. In general, known document imaging systems optically transmit a reflected image of an original document to an image recording device, such as an electrophotographic marking engine or a digital imaging sensor, for example. While other performance-related factors may also be considered, such as imaging rate (i.e., images per minute) and image resolution, for example, it is generally desirable for the recorded image to match the original document as closely as is reasonably possible.

Notwithstanding the common usage and overall success of known document imaging systems, some areas remain in which improvements in performance and/or operation of document imaging systems can be attained. For example, the image of an original document that is recorded by known document imaging systems can include variations of certain types and/or kinds when compared with the original document. The type, kind and occurrence rate of such variations differ from imaging system-to-imaging system. For example, the occurrence of lateral image offsets as well as changes in contrast from that of the original document have been observed in some document imaging systems, such as those that operate at relatively low imaging rates, for example.

FIG. 5 illustrates one example of a conventional document imaging system 50 during the use of which one or more of the aforementioned image variations have been observed to occur. Document imaging system 50 includes a transparent imaging platen 52 and an image recording device 54 that is in optical communication with the imaging platen by way of an imaging pathway 56. A document transport system (not numbered) includes a document transport roll 58 that is supported for rotation about an axis AX. A document entry guide 60 is supported adjacent the document transport roll such that a document entry pathway 62 is formed between the document guide and the document transport roll. First and second document exit guides 64 and 66 at least partially define a document exit pathway 68. Typically, first document exit guide 64 will be fixed on or along the imaging platen and second document exit guide 66 will be moveable relative to the imaging platen.

The document entry guide is supported on the same side of imaging platen 52 as the document transport roll and includes a guide surface 70 that has a distal end 72 spaced a distance from the imaging platen. The document transport roll is adapted to transport an original document from a first position DOC1 that is generally upstream of imaging pathway 56 to a second position DOC2 that is generally downstream of the imaging pathway.

As the original document is transported from the first position toward the second position, the trailing edge TEG of the original document will be supported on of along guide surface 70 until the point at which the trailing edge reaches distal end 72 of the document guide. As the original document is transported further downstream, the trailing edge becomes unsupported and falls or is otherwise displaced toward imaging platen 52. This occurrence is sometimes referred to in the art as an "edge flick" and can result in lateral image offsets due to the sudden movement of the portion of the original document that is being imaged at the time the trailing edge becomes unsupported by the document guide.

Another image variation that may occur under such conditions of operation is a change in contrast (i.e., the lightness/darkness level) from one portion of the recorded image to another. This image variation has been recognized as having a relation to the trailing edge of the original document becoming unsupported by the document guide. In particular, it has been recognized that the trailing edge of the original document becomes supported on the imaging platen once disengaged from the document guide. This results in a change in the angle and/or other aspects of illumination of the light emitted by exposure lamps 74 and the reflection of the light from the original document along imaging pathway 56, which are sometimes referred to in the art as "integrated cavity effects."

Accordingly, it is believed desirable to develop a document imaging system as well as a printing system and method of imaging that at least partially addresses the foregoing and/or other issues.

INCORPORATION BY REFERENCE

U.S. patent application Ser. No. 12/356,958 filed Jan. 29, 2009, entitled "DOCUMENT IMAGING SYSTEM AND METHOD," by Michael J. Wilsher is incorporated herein by reference in its entirety.

BRIEF DESCRIPTION

A printing system in accordance with the subject matter of the present disclosure is provided that includes a sheet media source capable of dispensing individual sheets of media and a sheet media outlet capable of outputting marked sheets of media. A marking unit is operatively connected between the sheet media source and the sheet media outlet. The marking unit is adapted to generate marked sheets of media from the individual sheets of media dispensed by the sheet media source. An original document imaging system is operative to transfer an image of an associated original document to the marking unit for marking on an individual sheet of media. The original document imaging system includes a document transport system that is capable of transporting an associated original document from a first transport position through an imaging zone to a second transport position with a leading edge of the associated original document disposed upstream of the imaging zone in the first transport position, and with a trailing edge of the associated original document disposed downstream of the imaging zone in the second transport position. An image pathway extends from the imaging zone in optical communication with the marking unit. A document guide having an entry guide surface including a first ramp and a second ramp is disposed in operative relation to said document transport system and capable of directing said leading edge of an associated original document toward said imaging zone at a first angle and directing said trailing edge of the associated original document toward said imaging zone at a second angle. The first ramp includes a distal edge disposed a first distance from the imaging zone and the second ramp includes a distal edge disposed a second distance from the imaging zone. The second distance is shorter than the first distance.

A printing system comprising a sheet media source capable of dispensing individual sheets of media; a sheet media outlet capable of outputting marked sheets of media; a marking unit operatively connected between the sheet media source and the sheet media outlet and adapted to generate marked sheets of media from the individual sheets of media dispensed by the sheet media source; and, an original document imaging system operative to transfer an image of an associated original document to the marking unit for marking on an individual sheet of media. The original document imaging system includes a document transport system capable of transporting an associated original document from a first transport position through an imaging zone to a second transport position with a leading edge of the associated original document disposed upstream of the imaging zone in the first transport position and with a trailing edge of the associated original document disposed downstream of the imaging zone in the second transport position; an image pathway extending from the imaging zone in optical communication with the marking unit; a document guide having an entry guide surface including a multi-tiered ramp with a first ramp and at least a second ramp disposed in operative relation to the document transport system and capable of directing the leading edge of an associated original document toward the imaging zone at a first angle and directing the trailing edge of the associated original document toward the imaging zone at at least a second angle; and, wherein the at least second angle is shallower than the first angle.

DETAILED DESCRIPTION

As discussed above, it will be appreciated that the subject matter of the present disclosure is broadly applicable for use in association with document imaging systems of any suitable type, kind, configuration and/or construction. As one example, the subject matter of the present disclosure can be used in association with document imaging systems suitable for generating and/or storing data corresponding to a document image (e.g., scanners and document scanning systems). As another example, the subject matter of the present disclosure can be used in association with printing systems, such as is shown and described herein. It is to be clearly understood, however, that the application and use shown and described herein is merely exemplary and is not intended to be limiting.

The terms "print", "printing" and "marking" as used herein are to be broadly interpreted to encompass any action or process involving the production and/or output of sheet media having text, images, graphics and/or other indicia formed thereon by any process, such as inkjet or electrophotographic processes, for example. The terms "printer" and "printing system" as used herein are to be broadly interpreted to encompass any device, apparatus or system that is capable of performing a "printing" action. Examples of such equipment and/or systems include, without limitation, electrophotographic copying machines, multi-function printer/copier/facsimile devices and high-speed printing/publishing systems.

Additionally, such exemplary embodiments of equipment, systems and/or processes can utilize sheet media of any suitable size, shape, type, kind, material, quality, weight and/or thickness (e.g., recycled paper, plain paper, bond paper, coated paper, card stock, transparencies and/or other media). Furthermore, such exemplary equipment, systems and/or processes can output indicia on such sheet media using any printing or marking substance, such as liquid ink, solid ink, toner and/or colorant, for example, in monochrome (e.g., black) or one or more colors, or any combination thereof.

Figure 1:
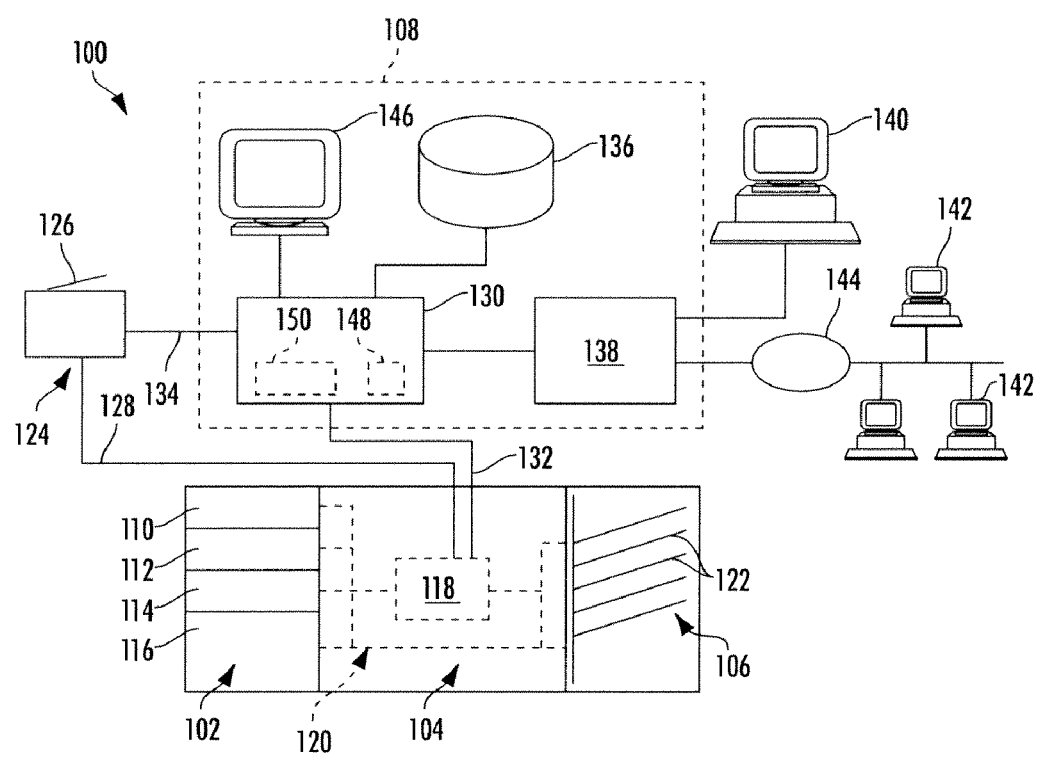
FIG. 1 is a schematic representation of one exemplary printing system including a document imaging system in accordance with the subject matter of the present disclosure.

Turning now to the drawings wherein the showings are for the purpose of illustrating exemplary embodiments, and not for limiting the same, FIG. 1 schematically illustrates a printing system 100 that includes a sheet media source 102, a marking system 104 in operative communication with the sheet media source, and a finishing unit 106 or other sheet media receiving system in operative communication with the sheet media source and/or marking system. Printing system 100 also includes a control system 108 in communication with one or more of the sheet media source, the marking system and the finishing unit for selective operation thereof. It is to be distinctly understood that aspects of the present disclosure are applicable to document imaging systems and/or devices of a wide variety of types and kinds, and that printing system 100 is merely exemplary of one system that includes such a document imaging system and/or device.

Sheet media source 102 is shown in FIG. 1 as including multiple media supply trays 110, 112, 114 and 116, which are suitable for storing bulk quantities of sheet media. It will be appreciated that the supply trays are operative to introduce individual sheets of media to a suitable sheet feeding system or mechanism for dispensing the individual sheets. Additionally, it will be appreciated that media supply trays 110-116 are capable of receiving and supporting quantities of sheet media of any one of a variety of different sizes (e.g., letter, legal, A4) and/or orientations (e.g., short-edge first, long-edge first) as well as sheet media of different types, kinds, materials or combinations of material, weights and/or thicknesses.

As shown in FIG. 1, marking system 104 can include one or more marking engines 118 (which may also be referred to herein as printing engines) in communication with sheet media source 102 through a media transport pathway 120. It will be appreciated that the one or more printing engines can be of any suitable type or kind, and that such one or more printing engines will operate in accordance with known marking principles, such as ink jet marking or electrophotographic marking, for example. Marking system 104 includes a structural framework or housing structure (not shown) that is capable of supporting the one or more printing engines. Additionally, media transport pathway 120 extends through at least a portion of the structural framework to operatively communicate with the one or more printing engines.

With continued reference to FIG. 1, finishing unit 106 is shown as being in communication with the one or more printing engines of marking system 104 via media pathway 120. The finishing unit can be of any suitable type or kind, and can optionally be capable of performing one or more finishing operations of any type or kind. For example, the finishing unit can include any number of one or more collection trays 122 for receiving sheets of media and can include any number of one or more compiling systems for at least approximately aligning the sheets of media within a collection tray. Additionally, the finishing unit could, optionally, be operative to perform sorting, collating, stapling, hole punching, offsetting, binding, folding, separator sheet inserting or any combination of these and/or any other finishing operations.

Printing system 100 is also shown in FIG. 1 as including a document imaging system 124 that is adapted for use in recording an image of an associated original document and is capable of reducing variations in the recorded image of the associated original document, in accordance with the subject matter of the present disclosure. Document imaging system 124 includes a document transport system 126 that is capable of feeding or otherwise transporting original documents through the document imaging system for image recordation. Document imaging system 124 can be in optical communication with one or more image recording devices. As one example, the document imaging system could include or otherwise be in optical communication with a digital image sensor or other suitable system or device capable of generating image data having a relation to an associated original document. Additionally, or in the alternative, document imaging system 124 can be in optical communication with the one or more marking engines (e.g., marking engine 118) of the marking system, such as by way of an imaging pathway, which is schematically represented in FIG. 1 by line 128.

In a preferred arrangement, document imaging system 124 is also in electrical communication with one or more other systems and/or components, such as one or more systems and/or components of control system 108, for example. In this manner, image and other data corresponding to an associated original document could be received by a digital image sensor and communicated to a controller or other device for processing and/or storage of image or other data. Additionally, or in the alternative, operation of the document transport system and a marking engine could be synchronized by a controller or other device.

Control system 108 can be utilized to operate the foregoing and other systems and/or components of printing system 100 in any suitable manner and using any suitable arrangement and/or configuration of other systems and/or components. For example, as shown in FIG. 1, control system 108 includes a controller 130 adapted for communication with one or more of the sheet media source, the marking system and/or the finishing unit in a suitable manner. In the exemplary arrangement shown, controller 130 is in communication with marking engine 118 of marking system 104 by way of one or more communication lines, as is schematically represented by line 132. Additionally, controller 130 is shown as being in communication with document imaging system 124, such as by way of one or more communication lines, which are schematically represented in FIG. 1 by line 134.

Control system 108 can optionally include a data storage device 136, such as a non-volatile memory or hard drive, for example, which is in communication with controller 130. The data storage device is preferably suitable for storing data, information and/or other values having a relation to the image of an associated original document (e.g., image data). Additionally, control system 108 can optionally include a communication interface 138, which is shown as being in communication with controller 130. Communication interface 138 can be used to send, receive or otherwise communicate print jobs and/or image data to and from the printing system. For example, image data corresponding to an associated original document could be generated by document imaging system 124 and transferred or otherwise sent from controller 130 to an associated external resource through communication interface 138, such as to a standalone computer 140 and/or to a computer workstation or terminal 142, for example, by way of any suitable line of communication, such as through a computer network 144, for example.

One or more user interface devices, such as a display, keyboard, pointing device, indicator lamp, associated computing device (e.g., a remotely connected or networked computer) or other input or output device, for example, is provided on printing system 100 and is in communication with controller 130. In one preferred embodiment, a display 146 is provided that outputs graphical programming windows for communication of text, graphics, data, values and/or information to a user or operator. Additionally, the user interface is adapted for user input of text, graphics, data, values and/or information, such as from the keyboard (not shown), pointing device (not shown) or, in one preferred embodiment, touch-screen input on display 146, for example. It will be appreciated, however, that the foregoing user interface arrangement is merely exemplary and that text, graphics, data, values and/or information can be inputted and outputted in any suitable manner.

Control system 108 can include a processing device, which can be of any suitable type, kind and/or configuration, such as a microprocessor 148, for example, for processing data, executing software routines/programs, and other functions relating to the performance and/or operation of the printing system (e.g., printing system 100) and/or any systems or components thereof (e.g., document imaging system 124). Additionally, the control system can include a storage device or memory 150, which can be of any suitable type, kind and/or configuration that can be used to store data, values, settings, parameters, inputs, software, algorithms, routines, programs and/or other information or content for any associated use or function, such as use in association with the performance and/or operation of the printing system or any systems and/or devices thereof, for example.

Figure 2:
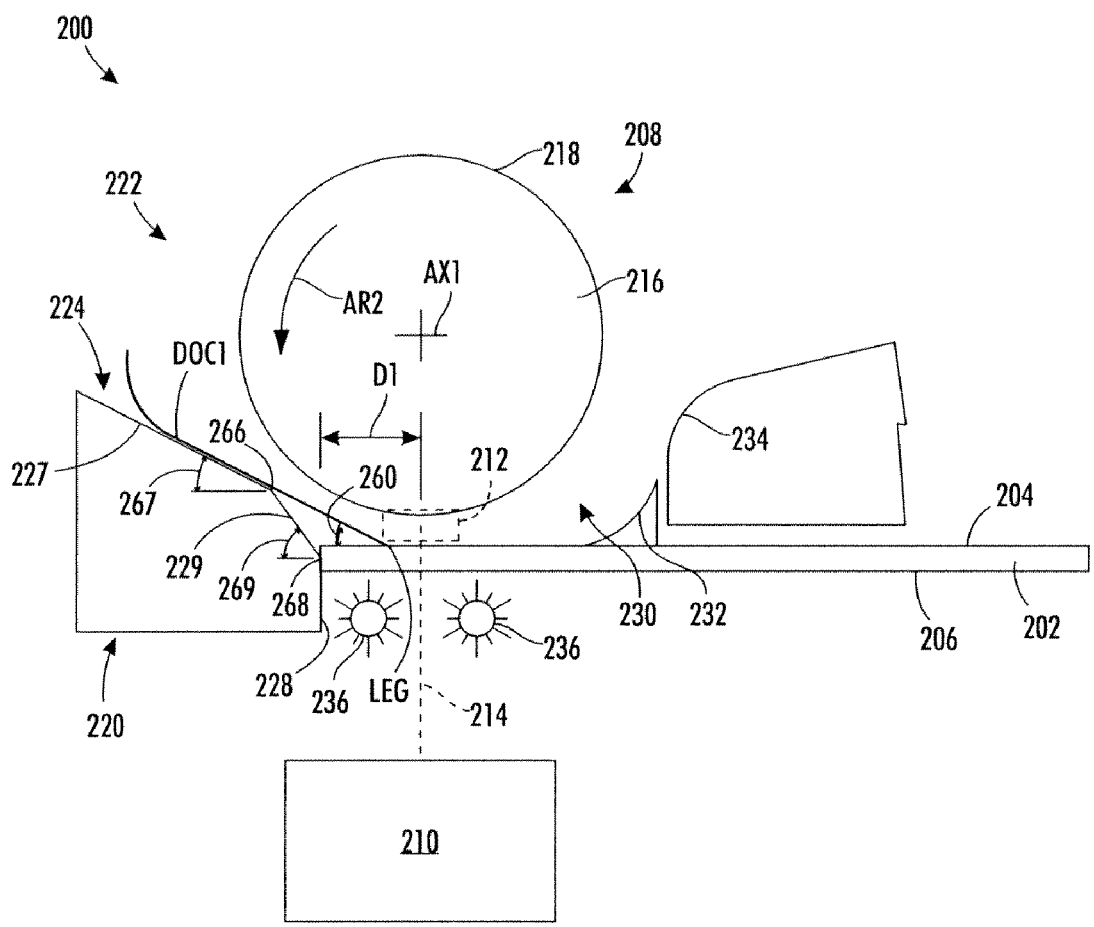
FIGS. 2 and 3 are side views schematically illustrating one example of a document imaging system in accordance with the subject matter of the present disclosure with an original document shown in first and second positions, respectively.
Figure 3:
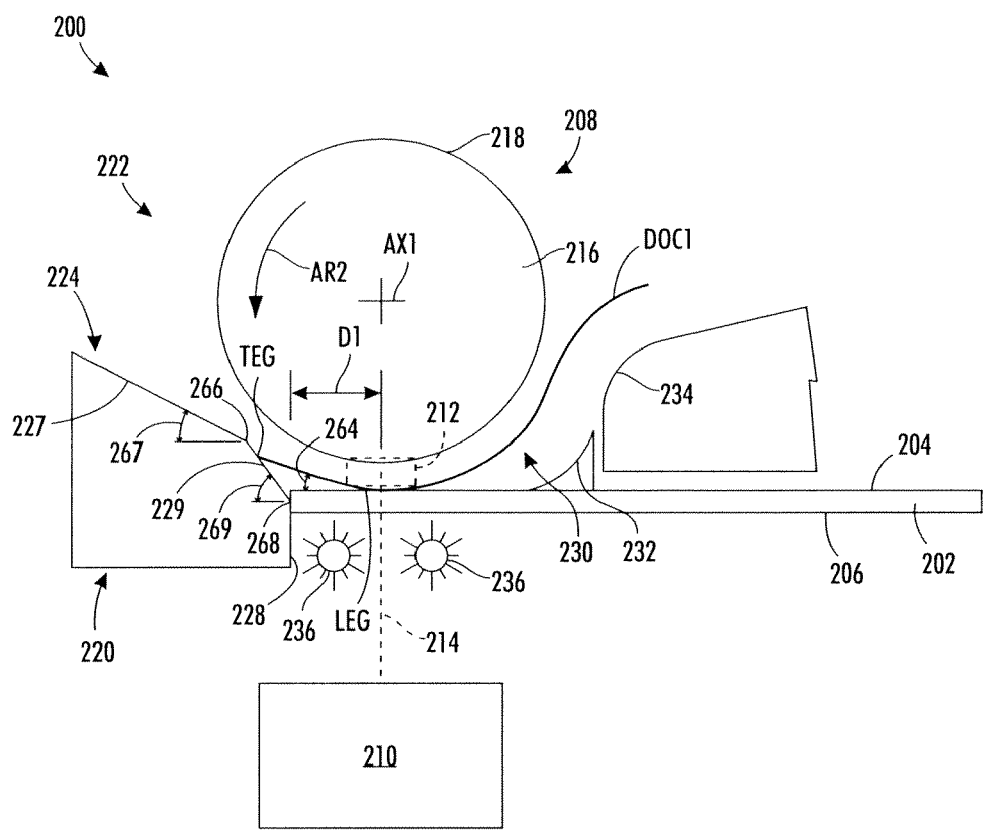
Figure 4:
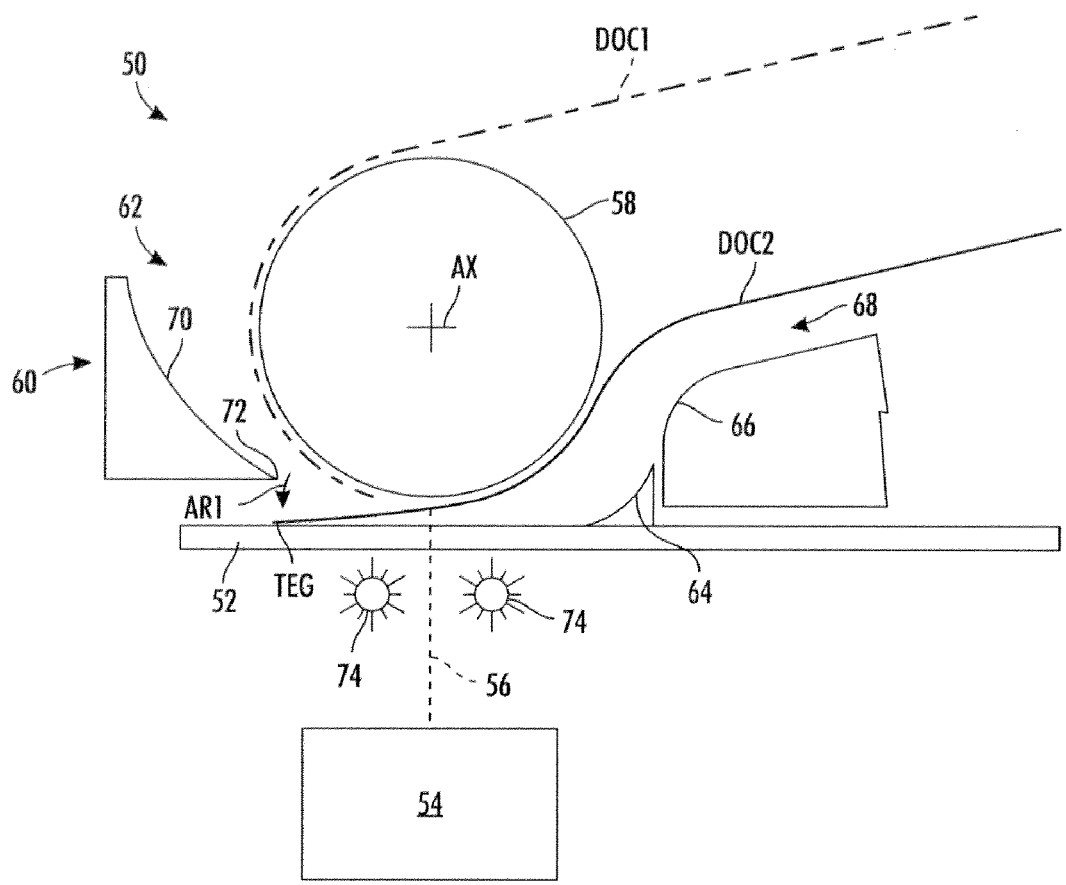
FIG. 4 is a side view schematically illustrating a conventional document imaging system.

One example of a document imaging system in accordance with the subject matter of the present disclosure, which would be suitable for use as document imaging system 124 in FIG. 1, is shown in FIGS. 2 and 3 and generally identified by reference number 200. Document imaging system 200 includes an imaging platen 202 that is formed from a substantially transparent material and includes opposing first and second sides or surfaces 204 and 206. A document transport system 208 is operatively disposed on the first side of imaging platen 202 and an image recording device 210 is operatively disposed on the second side of imaging platen 202. Image recording device 210 is schematically representative of any suitable system, device or combination thereof that may be used for recording an image of an associated original document. As discussed above, one example of a suitable image recording device is a digital imaging sensor or camera (e.g., a CCD array). Another example of a suitable image recording device is a marking engine, such as marking engine 118 discussed above with regard to FIG. 1, for example.

In a preferred arrangement, image recording device 210 is in optical communication with an imaging zone 212 disposed along document transport system 208 on the first side of imaging platen 202, such as by way of an imaging pathway that is schematically represented in FIGS. 2 and 3 by line 214. It will be appreciated that the imaging pathway can take any suitable form or configuration and can be formed using any suitable components and/or devices, such as one or more mirrors (not shown) and/or lenses (not shown), for example.

Document transport system 208 includes at least one document transport device that is suitable for frictionally engaging an associated original document and transporting the same through imaging zone 212. It will be appreciated that such action can be accomplished in any suitable manner and through the use of any suitable devices and/or components. For example, as shown in FIGS. 2 and 3, document transport system 208 includes a document transport roll 216 that includes an outer surface 218 for contacting and frictionally engaging the associated original documents. While it will be appreciated that any suitable arrangement and/or configuration could alternately be used, document transport roll 216 is shown as being elongated and having a cylindrical body with a longitudinally-extending axis AX1. Additionally, document transport roll 216 is supported on the document transport system for rotation about axis AX1, as indicated by arrow AR2.

Document imaging system 200 also includes a document entry guide 220 that is operative to direct incoming original documents toward imaging zone 212 for image recordation by image recording device 210. Document entry guide at least partially defines a document entry pathway 222 that incoming documents follow toward the imaging zone. A multi-tiered entry guide surface 224 at least partially defines document entry pathway 222, which extends from an upstream or proximal end 226 to a downstream or distal end 228 of the document entry guide. In FIGS. 2 and 3, entry guide surface 224 is shown as a two tiered or dual ramped surface that is capable of directing the leading edge of an associated original document toward the imaging zone at a first angle and directing the trailing edge of the associated original document toward the imaging zone at at least a second angle.

Original documents are transported by document transport system 208 from an upstream position, which is generally represented by DOC1 in FIG. 2 through imaging zone 212 toward a downstream position, which is generally represented by DOC1 in FIG. 3. As a leading edge LEG (FIG. 2) of an original document is transported through imaging zone 212, the leading edge follows a document exit pathway 230 that is at least partially defined by one or more document exit guides 232 and 234. In one arrangement, first document exit guide 232 may be fixed relative to the imaging platen and second document exit guide 234 may be moveable relative thereto.

Imaging zone 212 is generally defined by the one or more components and/or devices that form imaging pathway 214. Typically, one or more exposure lamps 236 can be positioned near the imaging zone to illuminate the associated original document for reflection along the imaging pathway to image recording device 210. In many cases, the imaging zone will be formed along a relatively small area along the length of the document transport roll. More specifically, the imaging zone can include an area extending longitudinally along the body of the document transport roll and having a relatively small cross-sectional arc length extending along each lateral side (i.e., upstream side/downstream side) of axis AX1. As such, distal end 228 of document entry guide 220 is spaced a first distance from the center of imaging zone 212, which is approximately aligned with axis AX1 of document transport roll 216, as is indicated by dimension D1 in FIG. 2.

A document imaging system in accordance with the subject matter of the present disclosure, such as document imaging system 200, for example, will provide the first lead-in angle for the leading edge of the associated original document, and then the at least second lead-in angle for the trailing edge of same said original document that is being imaged. In this manner, issues such as lateral image offsets due to edge flick and changes in image contrast due to integrating cavity effects can be minimized or at least reduced. For example, conventional document entry guides may be spaced from the imaging zone a distance sufficient to avoid or at least minimize the generation of undesirable effects during imaging of the original document. However, this distance is often great enough to permit image variations to occur in the marked portion of the original document rather than in an unmarked or margin area of the original document. In one arrangement, a document imaging system in accordance with the subject matter of the present disclosure, will support or otherwise lead-in the trailing edge of the original document toward the document transport device at a shallower angle relative to the lead-in angle of the leading edge. The change in angle reduces or eliminates the occurrence of edge flick by 'smoothing' the movement of the trailing edge of the original document as it falls toward the imaging platen. In this manner the trailing edge can slide down gradually onto the platen or glass as it approaches.

One example of a document imaging system that includes a document biasing arrangement suitable for use in such a manner is shown in FIGS. 2 and 3 as including a multi-tiered document entry guide 220. Document entry guide 220 can have an entry guide surface 224 including a first ramp 227 and a second ramp 229 disposed in operative relation to the document transport system and capable of directing the leading edge LEG of an associated original document DOC1 toward the imaging zone at a relatively constant first angle 260 and directing the trailing edge of the associated original document toward the imaging zone at a decreasing or declining second angle 264. It is to be appreciated, that as trailing edge TEG of DOC1 moves down ramp 229 and closer to the imaging zone, angle 264 will become shallower and shallower until the TEG rests upon the platen 202. The first ramp 227 includes a distal edge 266 disposed a first distance from the imaging zone and the second ramp 229 includes a distal edge 268 disposed a second distance from the imaging zone. The first ramp 227 includes a third angle 267 relative to an intersecting horizontal plane, and the second ramp 229 includes a fourth angle 269 relative to an intersecting horizontal plane. The third angle 267 is shallower or smaller than the fourth angle 269. It is to be appreciated that the document entry guide 220 can be mounted in such a manner that the second ramp distal edge 268 is positioned below the horizontal top surface 204 of platen 202 (see FIGS. 2 & 3).

In use, the second ramp 229 of the entry guide surface acts to support or otherwise bias, at the fourth angle, the trailing edge TEG of the original document DOC1 toward document transport roll 216 until trailing edge TEG of original document reaches platen 202. At such a point, the trailing edge TEG of the original document becomes unsupported by the document entry guide surface 224. During this advancement of the document DOC1, the trailing edge TEG will remain supported BY RAMP 229 and deflect toward the imaging platen 202 at a progressively shallower lead-in angle 264 and with a much minimized or nonexistent flick.

Furthermore, it will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A printing system comprising:
   a sheet media source capable of dispensing individual sheets of media;
   a sheet media outlet capable of outputting marked sheets of media;
   a marking unit operatively connected between said sheet media source and said sheet media outlet and adapted to generate marked sheets of media from said individual sheets of media dispensed by said sheet media source; and, an original document imaging system operative to transfer an image of an associated original document to said marking unit for marking on an individual sheet of media, said original document imaging system including:

a document transport system capable of transporting an associated original document from a first transport position through an imaging zone to a second transport position with a leading edge of the associated original document disposed upstream of said imaging zone in said first transport position and with a trailing edge of the associated original document disposed downstream of said imaging zone in said second transport position;

an image pathway extending from said imaging zone in optical communication with said marking unit;

a document guide having an entry guide surface including a first ramp and a second ramp disposed in operative relation to said document transport system and capable of directing said leading edge of an associated original document toward said imaging zone at a first angle and directing said trailing edge of the associated original document toward said imaging zone at at least a second angle wherein said at least second angle is shallower than said first angle;

said first ramp including a distal edge disposed a first distance from said imaging zone and said second ramp including a distal edge disposed a second distance from said imaging zone; and said second distance is less than said first distance.

2. A printing system according to claim 1, wherein said at least second angle is a progressively shallower angle as said trailing edge is directed closer toward said imaging zone.

3. A printing system comprising:

a sheet media source capable of dispensing individual sheets of media;

a sheet media outlet capable of outputting marked sheets of media;

a marking unit operatively connected between said sheet media source and said sheet media outlet and adapted to generate marked sheets of media from said individual sheets of media dispensed by said sheet media source; and, an original document imaging system operative to transfer an image of an associated original document to said marking unit for marking on an individual sheet of media, said original document imaging system including:

a document transport system capable of transporting an associated original document from a first transport position through an imaging zone to a second transport position with a leading edge of the associated original document disposed upstream of said imaging zone in said first transport position and with a trailing edge of the associated original document disposed downstream of said imaging zone in said second transport position;

an image pathway extending from said imaging zone in optical communication with said marking unit;

a document guide having an entry guide surface including a first ramp and a second ramp disposed in operative relation to said document transport system and capable of directing said leading edge of an associated original document toward said imaging zone at a first angle and directing said trailing edge of the associated original document toward said imaging zone at at least a second angle;

said first ramp including a distal edge disposed a first distance from said imaging zone and said second ramp including a distal edge disposed a second distance from said imaging zone;

said second distance is less than said first distance;

a substantially transparent imaging platen disposed in optical communication between said imaging zone and said image recording device such that said image pathway extends through said imaging platen;

wherein said platen is in a horizontal plane;

said first ramp includes a third angle relative to said horizontal plane;

said second ramp includes a fourth angle relative to said horizontal plane; and, said third angle is shallower than said fourth angle.

4. A printing system according to claim 3, wherein said second ramp distal edge is below said platen top surface.

5. A printing system comprising:

a sheet media source capable of dispensing individual sheets of media;

a sheet media outlet capable of outputting marked sheets of media;

a marking unit operatively connected between said sheet media source and said sheet media outlet and adapted to generate marked sheets of media from said individual sheets of media dispensed by said sheet media source; and an original document imaging system operative to transfer an image of an associated original document to said marking unit for marking on an individual sheet of media, said original document imaging system including:

a document transport system capable of transporting an associated original document from a first transport position through an imaging zone to a second transport position with a leading edge of the associated original document disposed upstream of said imaging zone in said first transport position and with a trailing edge of the associated original document disposed downstream of said imaging zone in said second transport position;

an image pathway extending from said imaging zone in optical communication with said marking unit;

a document guide having an entry guide surface including a multi-tiered ramp with a first ramp and at least a second ramp disposed in operative relation to said document transport system and capable of directing said leading edge of an associated original document toward said imaging zone at a first angle and directing said trailing edge of the associated original document toward said imaging zone at at least a second angle;

wherein said at least second angle is shallower than said first angle;

a substantially transparent imaging platen disposed in optical communication between said imaging zone and said image recording device such that said image pathway extends through said imaging platen;

wherein said platen is in a horizontal plane including a top surface; and, wherein said second ramp distal edge is below said platen top surface.

6. A printing system according to claim 5 wherein said at least second angle is a progressively shallower angle as said trailing edge is directed closer toward said imaging zone.

7. A printing system according to claim 5, further comprising a substantially transparent imaging platen disposed in optical communication between said imaging zone and said image recording device such that said image pathway extends through said imaging platen;
  wherein said platen is in a horizontal plane;
  said first ramp includes a third angle relative to said horizontal plane;
  said second ramp includes a fourth angle relative to said horizontal plane; and,
  said third angle is shallower than said fourth angle.

8. A printing system comprising:
  a sheet media source capable of dispensing individual sheets of media;
  a sheet media outlet capable of outputting marked sheets of media;
  a marking unit operatively connected between said sheet media source and said sheet media outlet and adapted to generate marked sheets of media from said individual sheets of media dispensed by said sheet media source; and,
  an original document imaging system operative to transfer an image of an associated original document to said marking unit for marking on an individual sheet of media, said original document imaging system including:
    a document transport system capable of transporting an associated original document from a first transport position through an imaging zone to a second transport position with a leading edge of the associated original document disposed upstream of said imaging zone in said first transport position and with a trailing edge of the associated original document disposed downstream of said imaging zone in said second transport position;
    an image pathway extending from said imaging zone in optical communication with said marking unit;
    a document guide having an entry guide surface including a first ramp and a second ramp disposed in operative relation to said document transport system and capable of directing said leading edge of an associated original document toward said imaging zone at a first angle and directing said trailing edge of the associated original document toward said imaging zone at at least a second angle;
    said first ramp including a distal edge disposed a first distance from said imaging zone and said second ramp including a distal edge disposed a second distance from said imaging zone;
    said second distance is less than said first distance;
    said at least second angle is a progressively shallower angle as said trailing edge is directed closer toward said imaging zone;
  a substantially transparent imaging platen disposed in optical communication between said imaging zone and said image recording device such that said image pathway extends through said imaging platen;
  wherein said platen is in a horizontal plane including a top surface;
  said first ramp includes a third angle relative to said horizontal plane;
  said second ramp includes a fourth angle relative to said horizontal plane; and,
  said third angle is shallower than said fourth angle.

9. A printing system according to claim 8, wherein said second ramp distal edge is below said platen top surface.

\* \* \* \* \*